US011621947B2

(12) United States Patent
Paczkowski et al.

(10) Patent No.: US 11,621,947 B2
(45) Date of Patent: *Apr. 4, 2023

(54) DATA MESSAGING SERVICE WITH DISTRIBUTED LEDGER CONTROL (71) Applicant: T-Mobile Innovations LLC, Overland Park, KS (US)

(72) Inventors: Lyle Walter Paczkowski, Mission Hills, KS (US); Ronald R. Marquardt, Woodinville, WA (US); Ivo Rook, New York, NY (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 158 days.

This patent is subject to a terminal disclaimer.

(21) Appl. No.: 17/306,480

(22) Filed: May 3, 2021

(65) Prior Publication Data
US 2021/0258291 A1 Aug. 19, 2021

Related U.S. Application Data (63) Continuation of application No. 16/276,087, filed on Feb. 14, 2019, now Pat. No. 11,038,857.

(51) Int. Cl.
| H04L 9/32 | (2006.01) |
| H04L 29/06 | (2006.01) |
| H04L 9/40 | (2022.01) |
| H04W 4/14 | (2009.01) |
| H04W 12/03 | (2021.01) |
| H04L 9/06 | (2006.01) |

(52) U.S. Cl.
CPC ........ H04L 63/0485 (2013.01); H04W 4/14 (2013.01); H04W 12/03 (2021.01)

(58) Field of Classification Search
CPC ...... H04L 63/0485; H04W 12/03; H04W 4/14
USPC ........................................................ 713/153
See application file for complete search history.

(56) References Cited

U.S. PATENT DOCUMENTS

| 7,797,233 | B2 * | 9/2010 | Sobek .................... G06Q 40/00 |
| | | | 713/153 |
| 7,873,573 | B2 | 1/2011 | Realini |
| 8,856,910 | B1 * | 10/2014 | Rostami-Hesarsorkh .................. |
| | | | H04L 63/1408 |
| | | | 713/168 |
| 9,397,985 | B1 | 7/2016 | Seger, II et al. |
| 9,985,964 | B2 | 5/2018 | Andrade |
| 10,715,336 | B2 * | 7/2020 | Wright ................. H04W 12/02 |
| 10,897,498 | B1 * | 1/2021 | Paczkowski ...... H04W 28/0268 |

(Continued)

Primary Examiner — Haresh N Patel (57) ABSTRACT

In a messaging server, processing circuitry receives a network packet that encapsulates a user message from a wireless User Equipment (UE) over a wireless communication network. In response to the network packet, the processing circuitry transfers the user message to ledger circuitry in the messaging server. The ledger circuitry executes a distributed ledger transaction based on a source domain and a destination domain in the user message. The ledger circuitry transfers the user message to the processing circuitry after the distributed ledger transaction. The processing circuitry receives the user message from the ledger circuitry and generates a new network packet for delivery to the destination domain that encapsulates the user message. The ledger circuitry transfers the new network packet that encapsulates the user message for delivery to the destination domain.

20 Claims, 6 Drawing Sheets

(56) References Cited

U.S. PATENT DOCUMENTS

| | | | |
|---|---|---|---|
| 11,038,857 B1 * | 6/2021 | Paczkowski | H04L 63/0485 |
| 2008/0235507 A1 * | 9/2008 | Ishikawa | H04L 63/0428 |
| | | | 713/150 |
| 2009/0125595 A1 * | 5/2009 | Maes | H04L 51/214 |
| | | | 709/206 |
| 2009/0252159 A1 * | 10/2009 | Lawson | H04L 9/3247 |
| | | | 379/142.04 |
| 2010/0114964 A1 * | 5/2010 | Kerschbaum | H04L 9/3234 |
| | | | 713/153 |
| 2011/0106709 A1 * | 5/2011 | Puura | H04W 4/24 |
| | | | 705/64 |
| 2011/0238545 A1 * | 9/2011 | Fanaian | G06Q 30/02 |
| | | | 705/34 |
| 2013/0022033 A1 * | 1/2013 | Shi | H04W 76/12 |
| | | | 370/338 |
| 2013/0144944 A1 * | 6/2013 | Wohlert | G06Q 50/01 |
| | | | 709/204 |
| 2014/0067571 A1 * | 3/2014 | Fricke | G06Q 20/327 |
| | | | 705/21 |
| 2014/0082719 A1 * | 3/2014 | Persson | H04L 12/462 |
| | | | 726/15 |
| 2015/0050977 A1 * | 2/2015 | Omar | H04W 12/06 |
| | | | 455/26.1 |
| 2015/0271148 A1 * | 9/2015 | Ahari | G06Q 10/06 |
| | | | 713/153 |
| 2016/0260169 A1 | 9/2016 | Arnold et al. | |
| 2017/0221029 A1 * | 8/2017 | Lund | G06Q 50/184 |
| 2017/0337534 A1 * | 11/2017 | Goeringer | H04L 63/12 |
| 2018/0121912 A1 * | 5/2018 | Morales | H04W 12/041 |
| 2018/0262493 A1 | 9/2018 | Andrade | |
| 2018/0329693 A1 | 11/2018 | Eksten et al. | |
| 2019/0036682 A1 * | 1/2019 | Qiu | H04L 9/3265 |
| 2019/0098492 A1 * | 3/2019 | Shalayev | H04W 12/03 |
| 2019/0158470 A1 * | 5/2019 | Wright | G06F 21/305 |
| 2019/0158674 A1 * | 5/2019 | Nelson | H04M 15/8038 |
| 2019/0164137 A1 * | 5/2019 | Vincent | H04L 9/3239 |
| 2019/0207768 A1 * | 7/2019 | Hardy | H04L 9/3239 |
| 2020/0059458 A1 * | 2/2020 | Abraham | H04L 41/0895 |
| 2020/0059459 A1 * | 2/2020 | Abraham | H04L 63/0272 |
| 2020/0059510 A1 * | 2/2020 | Russom | H04L 67/10 |
| 2020/0153605 A1 * | 5/2020 | Hu | H04L 9/3247 |
| 2020/0195431 A1 * | 6/2020 | Athmalingam | H04L 9/3239 |

* cited by examiner

DATA MESSAGING SERVICE WITH DISTRIBUTED LEDGER CONTROL

RELATED CASES

This U.S. patent application is a continuation of U.S. patent application Ser. No. 16/276,087 that was filed on Feb. 14, 2019, now U.S. Pat. No. 11,038,857, and is entitled "DATA MESSAGING SERVICE WITH DISTRIBUTED LEDGER CONTROL." U.S. patent application Ser. No. 16/276,087, now U.S. Pat. No. 11,038,857, is hereby incorporated by reference into this U.S. patent application.

TECHNICAL BACKGROUND

Data messaging services exchange data messages between user communication devices. Exemplary data messaging services include e-mail, text messaging, and chat sessions. Data messages transport user information and also indicate their source and destination. Data communication networks route the data messages based on these source and destination indications. The data communication networks often encapsulate the data messages in other data packets. For example, a messaging server may encapsulate Short Message Service (SMS) messages in Internet Protocol (IP) packets and/or Session Initiation Protocol (SIP) messages. The encapsulation of the data messages supports data tunneling between the messaging server and the user communication devices. The messaging server often receives a data message over a data tunnel from a sending user device and routes the data message over another data tunnel to the receiving user device.

The wireless communication networks deploy Network Function Virtualization Infrastructures (NFVIs) that execute Virtual Network Functions (VNFs) to serve the user communication devices. The NFVIs are computer systems with virtualization software. The VNFs are network elements like message servers, data routers, network controllers, and authorization databases. A wireless communication network is able to quickly launch a set of VNFs in the NFVIs, and the NFVI/NFV combination is called a network slice. Thus, wireless communication networks launch network slices that include messaging server VNFs. The messaging server VNFs receive data messages over data tunnels from sending user devices and route the data message over other data tunnels to the receiving user devices.

A distributed ledger comprises a computer network of distributed ledger nodes. The distributed ledger nodes each maintain a copy of ledger data in a blockchain database format. The blockchain database format stores a hash of the previous data block in the current data block. These hashes and a high number of ledger nodes make the ledger data virtually immutable. The ledger nodes have endorser nodes that receive proposed ledger transactions. The endorser nodes process chain code to execute test transactions based on the proposals and may endorse test transactions per ledger endorsement rules.

When a ledger transaction is endorsed, ledger orderer nodes distribute the endorsed ledger transactions to peer nodes per orderer rules. The peer nodes process the chain code to execute the endorsed ledger transaction. The peer ledger nodes may reach consensus on the executed ledger transaction, and when peer consensus is formed for the ledger transaction, the peer ledger nodes commit the ledger transaction to the immutable blockchain database and transfer chain code output. Unfortunately, current data messaging services do not efficiently and effectively transfer encrypted data between the user communication devices under the control of distributed ledgers.

TECHNICAL OVERVIEW

In a messaging server, processing circuitry receives a network packet that encapsulates a user message from a wireless User Equipment (UE) over a wireless communication network. In response to the network packet, the processing circuitry transfers the user message to ledger circuitry in the messaging server. The ledger circuitry executes a distributed ledger transaction based on a source domain and a destination domain in the user message. The ledger circuitry transfers the user message to the processing circuitry after the distributed ledger transaction. The processing circuitry receives the user message from the ledger circuitry and generates a new network packet for delivery to the destination domain that encapsulates the user message. The ledger circuitry transfers the new network packet that encapsulates the user message for delivery to the destination domain.

DETAILED DESCRIPTION

Figure 1:
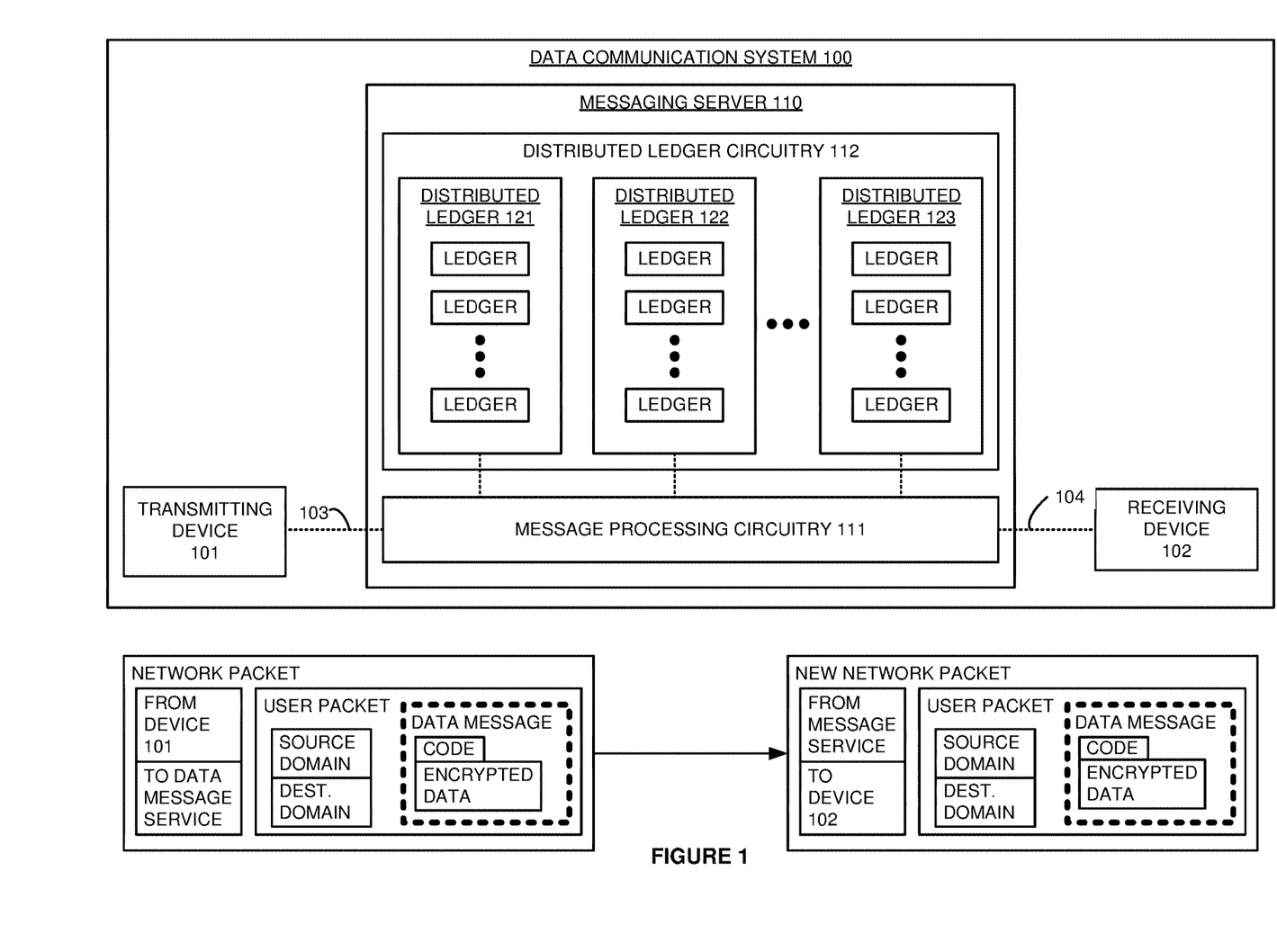
FIG. 1 illustrates a data communication system that transfers encrypted data for a data messaging service under distributed ledger control.

FIG. 1 illustrates data communication system 100 that transfers encrypted data for a data messaging service under distributed ledger control. The data messaging service may transport user messages, machine commands, sensor data, and the like. Data communication system 100 comprises transmitting device 101, receiving device 102, data links 103-104, and messaging server 110. Messaging server 110 comprises message processing circuitry 111 and distributed ledger circuitry 112. Distributed ledger circuitry 112 hosts distributed ledgers 121-123. Data communication system 100 has been simplified for clarity and typically includes many more transmitting devices, receiving devices, and distributed ledgers.

Transmitting device 101 and receiving device 102 comprise any apparatus having circuitry to transmit and/or receive data messages. Devices 101-102 could be robots, controllers, vehicles, computers, sensors, phones, and the like. Devices 101-102 comprise communication circuitry and control circuitry. The communication circuitry comprises digital/analog interfaces, processing circuitry, memory circuitry, firmware/software, and bus circuitry. The communication circuitry may comprise radio circuitry that includes antennas, modulators, amplifiers, and filters. The control circuitry comprises processing circuitry, memory circuitry, bus circuitry, and software. The software is stored in the memory circuitry and includes an operating system, network applications, and messaging application. In the control circuitry, the processing circuitry executes the operating system, network applications, and messaging application to exchange data messages.

Data links 103-104 comprise communication paths and network elements. Data links 103-104 use Institute of Electrical and Electronic Engineers (IEEE) 802.11 (WIFI), IEEE 802.3 (Ethernet), Internet Protocol (IP), Data Over Cable System Interface Specification (DOCSIS), Wave Division Multiplexing (WDM), Fifth Generation New Radio (5GNR), Long Term Evolution (LTE), Time Division Multiplexing (TDM), and/or the like. The network elements may comprise access points, routers, switches, network controllers, authorization databases, and the like.

Message processing circuitry 111 comprises communication circuitry and control circuitry. The communication circuitry comprises digital/analog interfaces, processing circuitry, memory circuitry, firmware/software, and bus circuitry. The control circuitry comprises processing circuitry, memory circuitry, bus circuitry, and software. The software is stored in the memory circuitry and includes an operating system and messaging applications. In the control circuitry, the processing circuitry executes the operating system and the messaging applications to handle data messages. In some examples, message processing circuitry 111 is integrated within a wireless network slice and/or a Network Function Virtualization Infrastructure (NFVI).

Distributed ledger circuitry 112 comprises processing circuitry, memory circuitry, bus circuitry, transceiver circuitry, and software. Distributed ledgers 121-123 each comprise portions of this circuitry and software. Distributed ledgers 121-123 maintain ledgers, and the ledgers for a single distributed ledger like ledger 121 are hosted by a geographically-diverse set of distributed ledger circuitry 112. Distributed ledger nodes 121-123 maintain store the ledger data in a blockchain database format.

The blockchain database format stores a hash of the previous data block in the current data block. These hashes and a high number of distributed ledger nodes make the ledger data virtually immutable. The ledger nodes have endorser nodes that receive proposed ledger transactions. The endorser nodes process chain code to execute test transactions based on the proposals and may endorse the test transactions per ledger endorsement rules. When a ledger transaction is endorsed, ledger orderer nodes distribute the endorsed ledger transaction to peer nodes per orderer rules. The peer nodes process the chain code to execute the endorsed ledger transaction. When the peer nodes reach consensus on the executed ledger transaction, the peer nodes commit the ledger transaction to the immutable blockchain database and transfer chain code output. The chain code output includes message-handling instructions for the data messaging service.

Transmitting device 101 generates a network packet that is depicted on the left below data communication system 100. The network packet is addressed from transmitting device 101 and to the data messaging service. The network packet encapsulates a user packet that encapsulates a data message. The user packet indicates a source domain and a destination (DEST.) domain. The data message comprises an unencrypted code and encrypted data. For example, the network packet may comprise a Session Initiation Protocol (SIP) message that indicates an International Mobile Subscriber Identifier (IMSI) for transmitting device 101 and a Short Message Service (SMS). The SIP message encapsulates an IP message that is addressed from a source IP address to a destination IP address and that encapsulates an SMS message. The SMS message has an unencrypted SMS Short Code (SC) and the encrypted data.

Messaging processing circuitry 111 receives the network packet from transmitting device 101 over data link 103. Message processing circuitry 111 authorizes transmitting device 101 for the data messaging service. For example, a Call State Control Function (CSCF) may dip a Home Subscriber System (HSS) with the IMSI for transmitting device 101 to yield an SMS authorization. In response to the source domain, the destination domain, and/or the unencrypted code in the data message, message processing circuitry 111 transfers the user packet that encapsulates the data message to distributed ledger circuitry 112.

Distributed ledger circuitry 112 receives the user packet that encapsulates the data message from message processing circuitry 111. Distributed ledger circuitry 112 executes a distributed ledger transaction with the source domain, the destination domain, and the unencrypted code to determine how the data message should be handled. The data message might be routed, stored, or discarded, and message-handling notices or two-factor authentication responses may be sent. For example, chain code in distributed ledger 122 may translate the source domain and the destination domain from the user packet into the IMSI for receiving device 102. In response, distributed ledger circuitry 112 commits the user packet, the transmitting device identifier, and the receiving device identifier to distributed ledger memory. Distributed ledger circuitry 112 transfers the user packet and the receiving device identifier to message processing circuitry 111.

Message processing circuitry 111 receives the user packet and the receiving device identifier from distributed ledger circuitry 112. In response, message processing circuitry 111 encapsulates the user packet in a new network packet. The new network packet is depicted on the right below data communication system 100. The new network packet is addressed from the messaging service to the receiving device identifier. For example, message processing circuitry 111 may encapsulate the original user packet in a new SIP message that is addressed from the SMS to the IMSI of receiving device 102. Message processing circuitry 111 transfers the new network packet to receiving device 102 over data link 104.

Receiving device 102 receives new network packet from messaging circuitry 111 over data link 104. The new network packet encapsulates the user packet that encapsulates the data message. Receiving device 102 decrypts the data message and processes the user data. For example, receiving device 102 may decrypt and process a critical machine command to control a manufacturing robot.

In some examples, receiving device 102 generates and transfers a message receipt notice responsive to processing the data message. Message processing circuitry 111 receives the message receipt notice for the data message from receiving device 102 over data link 104. Message processing circuitry 111 transfers the message receipt notice to distributed ledger circuitry 112. Distributed ledger circuitry 112 receives the message receipt notice and executes another distributed ledger transaction with the message receipt notice, the source domain, the destination domain, and the unencrypted code. In response, distributed ledger circuitry 112 commits the message receipt notice to distributed ledger memory and transfers the message receipt notice and the identifier for transmitting device 111 to message processing circuitry 111. Message processing circuitry 111 receives the message receipt notice and the transmitting device identifier. In response, message processing circuitry 111 encapsulates the message receipt notice in another network packet. The other network packet is addressed from the messaging service to the transmitting device identifier and encapsulates the message receipt notice. Message processing circuitry 111 transfers the other network packet for delivery to transmitting device 101. Transmitting device 101 receives the other network packet and processes the message receipt notice.

In some examples, distributed ledger circuitry 112 executes the other distributed ledger transaction to determine a third-party for the message receipt notice. In response, distributed ledger circuitry 112 transfers the message receipt notice and an identifier for the third-party to message processing circuitry 111. Message processing circuitry 111 receives the message receipt notice and the third-party identifier. In response, message processing circuitry 111 encapsulates the message receipt notice in another network packet that is addressed from the messaging service to the third-party identifier. Message processing circuitry 111 transfers the other network packet for delivery to the third-party.

In some examples, distributed ledger circuitry 112 determines that a message transfer notice should be sent to transmitting device 101 in response to executing the distributed ledger transaction. Distributed ledger circuitry 112 commits the message transfer notice to distributed ledger memory and transfers the message transfer notice and the transmitting device identifier to message processing circuitry 111. Message processing circuitry 111 receives the message transfer notice and the transmitting device identifier. In response, message processing circuitry 111 encapsulates the message transfer notice in another network packet that is addressed from the messaging service to the transmitting device identifier. Message processing circuitry 111 transfers the other network packet to transmitting device 101. Transmitting device 101 receives the other network packet and processes the message transfer notice.

In some examples, distributed ledger circuitry 112 determines that a message transfer notice should be sent to a third-party in response to executing the distributed ledger transaction. Distributed ledger circuitry 112 transfers the message transfer notice and a third-party identifier to message processing circuitry 111. Message processing circuitry 111 encapsulates the message transfer notice in another network packet that is addressed from the messaging service to the third-party identifier. Message processing circuitry 111 transfers the other network packet having the message transfer notice to the third-party. The third-party receives the other network packet and processes the message transfer notice.

In some examples, transmitting device 101 requires authentication from receiving device 102. Transmitting device 101 transfers a data message with a passcode in a user packet that is encapsulated by a network packet. Receiving device 102 receives the network packet and validates the passcode from the data message. For two-factor verification, receiving device 102 sends a verification code in a data message to transmitting device 101 that is encapsulated by user packet that is encapsulated by a network packet. Based on the domains, the unencrypted code, and the verification code, message processing circuitry 111 transfers the user packet having the verification code to distributed ledger circuitry 112. Distributed ledger circuitry 112 receives the data message and executes another distributed ledger transaction with the domains, the unencrypted code, and the verification code. In response, distributed ledger circuitry 112 commits the verification code to distributed ledger memory and transfers the verification code and the identifier for receiving device 102 to message processing circuitry 111. Message processing circuitry 111 receives the unencrypted verification code and receiving device identifier. In response, message processing circuitry 111 encapsulates the verification code in another network packet. The other network packet is addressed from the messaging service to the receiving device identifier and encapsulates a user packet that encapsulates a data message having the verification code. Message processing circuitry 111 transfers the other network packet for delivery to receiving device 102. Receiving device 102 receives the other network packet and processes the verification code to complete the two-factor authentication. Transmitting device 101 uses distributed ledger circuitry 112 to handle the second part of the two-factor authentication.

Advantageously, messaging server 110 transfers data messages that transport encrypted data from transmitting device 101 to receiving device 102 under the control of distributed ledgers 121-123. Moreover, messaging server 110 logs message metadata in distributed ledgers 121-123, but messaging server 110 does not decrypt the encrypted data in the data messages.

Figure 2:
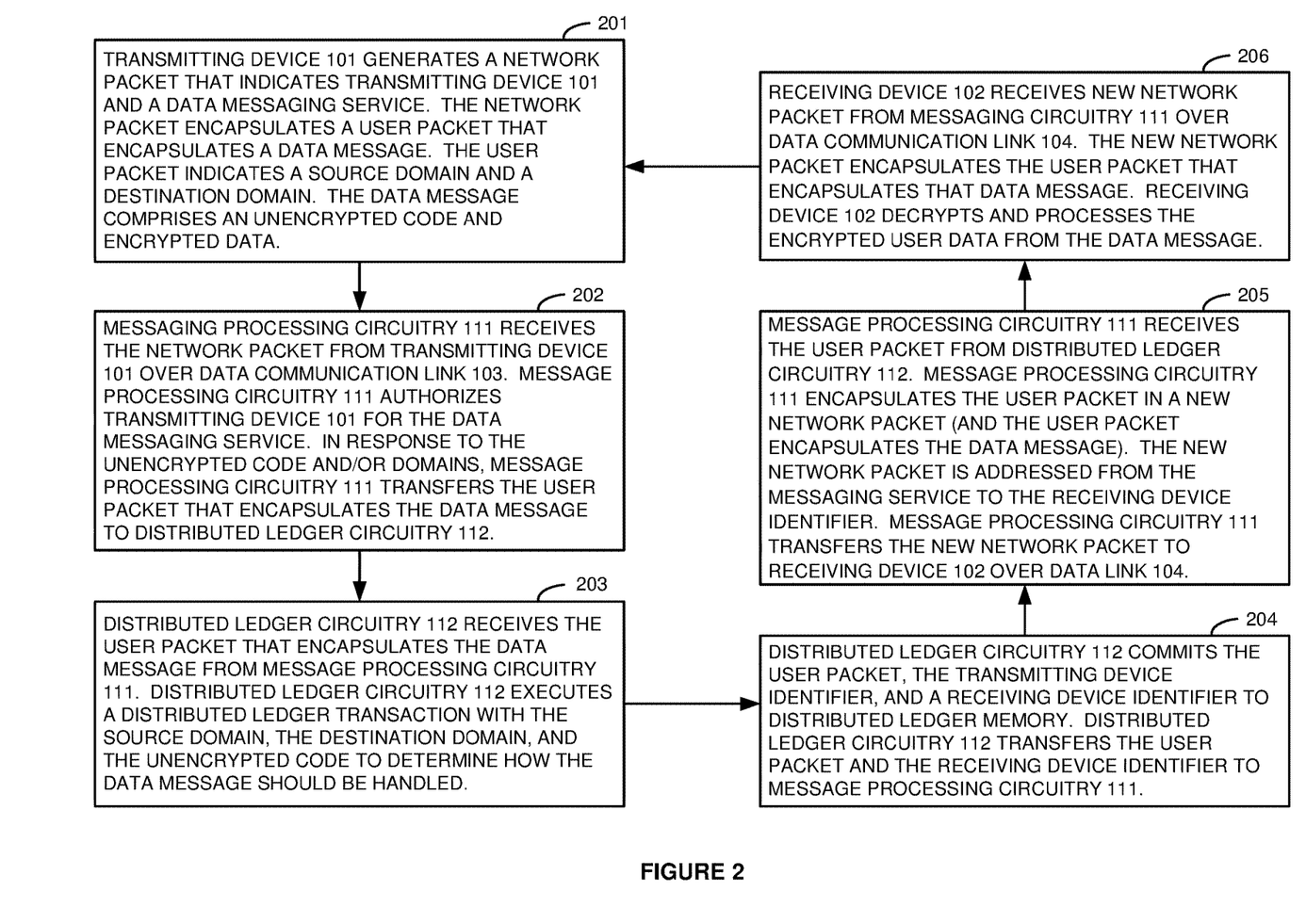
FIG. 2 illustrates the operation of the data communication system to transfer the encrypted data for the data messaging service under distributed ledger control.

FIG. 2 illustrates the operation of data communication system 100 to transfer encrypted data for the data messaging service under distributed ledger control. Transmitting device 101 generates a network packet that indicates transmitting device 101 and the data messaging service (201). The network packet encapsulates a user packet that encapsulates a data message. The user packet indicates a source domain and a destination domain. The data message comprises an unencrypted code and the encrypted data. Messaging processing circuitry 111 receives the network packet from transmitting device 101 over data communication link 103 (202). Message processing circuitry 111 authorizes transmitting device 101 for the data messaging service, and then in response to the unencrypted code and/or the domains, message processing circuitry 111 transfers the user packet that encapsulates the data message to distributed ledger circuitry 112. Message processing circuitry 111 does not decrypt the encrypted data in the data message.

Distributed ledger circuitry 112 receives the user packet that encapsulates the data message from message processing circuitry 111 (203). Distributed ledger circuitry 112 executes a distributed ledger transaction with the source domain, the destination domain, and the unencrypted code to determine how the data message should be handled. The data message might be routed, stored, or discarded, and message-handling notices and/or two-factor authentications may be sent. Distributed ledger circuitry 112 commits the user packet, the transmitting device identifier, and the receiving device identifier to distributed ledger memory (204). Distributed ledger circuitry 112 transfers the user packet and the receiving device identifier to message processing circuitry 111. Distributed ledger circuitry 112 stores but cannot decrypt the encrypted data.

Message processing circuitry 111 receives the user packet back from distributed ledger circuitry (205). Message processing circuitry 111 encapsulates the user packet in a new network packet. The new network packet is addressed from the messaging service to the receiving device identifier. Message processing circuitry 111 transfers the new network packet to receiving device 102 over data link 104. Receiving device 102 receives new network packet from messaging circuitry 111 over data link 104 (206). The new network packet encapsulates the user packet that encapsulates that data message that transports the encrypted data. Receiving device 102 decrypts the data message and processes the data. For example, receiving device 102 may decrypt and process drone status to issue a critical drone command.

Figure 3:
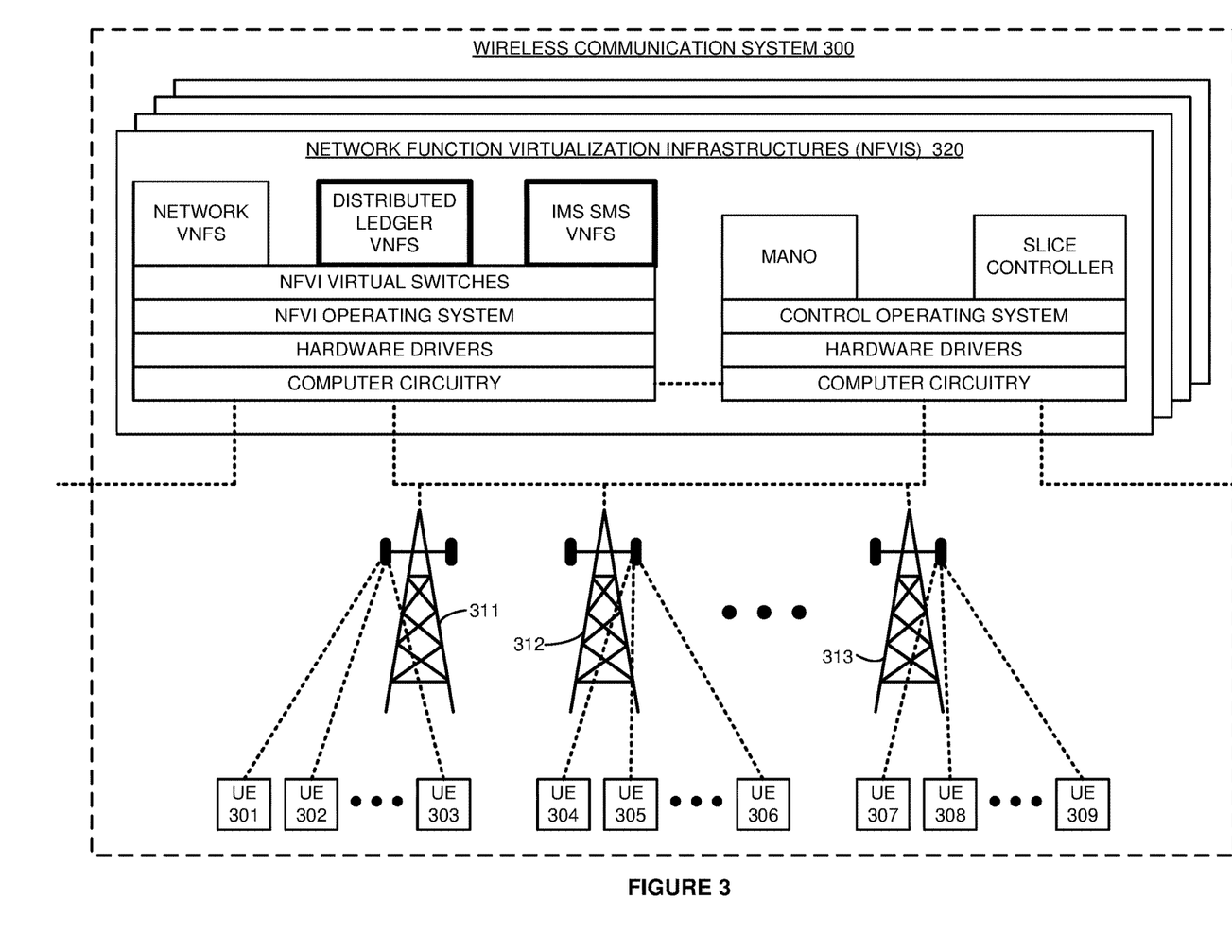
FIG. 3 illustrates a wireless communication system to transfer the encrypted data for a data messaging service under distributed ledger control.

FIG. 3 illustrates wireless communication system 300 to transfer encrypted data for a data messaging service under distributed ledger control. Wireless communication system 300 is an example of data communication system 100 although system 100 could differ. Wireless communication system 300 comprises (User Equipment) UEs 301-309, Radio Access Networks (RANs) 311-313, and NFVIs 320. NFVIs 320 each comprise computer circuitry and software. The software comprises hardware drivers, NFVI operating systems, NFVI virtual switches, network Virtual Network Functions (VNFs), distributed ledger VNFs, Internet Protocol Multimedia Subsystem (IMS) Short Message Service (SMS) VNFs, control operating systems, slice controller (CNT) and Management and Orchestration (MANO). UEs 301-309 exchange data with RANs 311-313 over wireless data links. RANs 311-313 exchange data with NFVIs 320 over data links. NFVIs 320 exchange data with external systems over data links. Wireless communication system 300 has been simplified for clarity and typically includes many more UEs, RANs, and NFVIs than the amount shown.

UEs 301-309 comprise radio circuitry and control circuitry. The radio circuitry comprises antennas, modulators, amplifiers, filters, digital/analog interfaces, processing circuitry, memory circuitry, firmware/software, and bus circuitry. The control circuitry comprises processing circuitry, memory circuitry, bus circuitry, and software. The software is stored in the memory circuitry and includes operating system, network applications, and user applications. In the baseband circuitry, the processing circuitry executes operating system, network applications, and user applications to exchange data with RANs 311-313.

RANs 311-313 comprise wireless access points and backhaul circuitry. The wireless access points include LTE eNodeBs, 5GNR gNodeBs, WIFI access points, and/or the like. The backhaul circuitry comprises TDM, Ethernet, IP, DOCSIS, WDM, LTE, 5GNR, WIFI, and/or the like. The wireless access points comprise radio circuitry and baseband circuitry. The radio circuitry comprises antennas, modulators, amplifiers, filters, digital/analog interfaces, processing circuitry, memory circuitry, firmware/software, and bus circuitry. The baseband circuitry comprises processing circuitry, memory circuitry, bus circuitry, and software. The software is stored in the memory circuitry and includes an operating system and network applications. In the baseband circuitry, the processing circuitry executes the operating system and network applications to exchange data between UEs 301-309 and NFVIs 320.

NFVIs 320 comprise computer circuitry and software. The computer circuitry comprises processing circuitry like Central Processing Units (CPUs), Graphics Processing Units (GPUs), and/or Application Specific Integrated Circuits (ASICs). The computer circuitry comprises memory circuitry like Random Access Memory (RAM), flash drives, and/or disc drives. The computer circuitry comprises transceiver circuitry like Network Interface Cards (NICs), networking System-On-Chip (SOC), and/or bus interfaces. The computer circuitry includes bus circuitry to interconnect the processing circuitry, memory circuitry, and transceiver circuitry. The software is stored in the memory circuitry and is executed in the processing circuitry.

The hardware drivers communicate with hardware components like CPUs, RAM, flash dives, bus interfaces, NICs, and the like. The NFVI operating system and the control operating system communicate with the various hardware drivers. The NFVI operating system may include hypervisors, NFV control agents, and the like. The NFVI virtual switches couple the VNFs and interface the VNFs to the NFVI operating system. The slice controller directs the creation, modification, and termination of network slices by signaling the MANO, RANs 311-313, and UEs 301-309. The MANO includes an orchestrator, Virtual Infrastructure Manager (VIM), and VNF Manager (VNFM) to control the execution of VNFs in NFVIs 320. The distributed ledger VNFs endorse message transactions, execute message transactions, store message data in immutable block chains, and transfer outputs including message-handling instructions.

The network VNFs comprise User Plane Function (UPF), Access and Mobility Management Function (AMF), Session Management Function (SMF), Authentication Server Function (AUSF), Policy Control Function (PCF), Unified Data Management (UDM), Application Function (AF), Network Repository Function (NRF), Network Slice Selection Function (NSSF), Network Exposure Function (NEF), Mobility Management Entity (MME), Home Subscriber System (HSS), Serving Gateway (S-GW), Packet Data Network Gateway (P-GW), Policy Control Rules Function (PCRF), and typically other network functions.

The UPF routes data packets and forms an anchor point for user mobility. The UPF inspects packets and applies Quality-of-Service. The AMF manages authentication, authorization, connections, mobility, N1 signaling, ciphering, registration, and security. The SMF manages session establishment, modification, and release. The SMF handles network addressing, Dynamic Host Control Protocol (DHCP), N1 signaling, downlink notification, and traffic steering. The AUSF authenticates and authorizes users. The UDM generates user authentication credentials and supports user identification, authorization, and subscriptions. The PCF provides policy rules and decisions. The AF routes traffic and implements policy controls. The NRF enables service discovery and maintain network function profiles/instances. The NSSF selects network slices to serve users and determine slice assistance information and AMFs. The NEF exposes capabilities and events. The NEF securely interacts with external applications and translates internal/external information.

The MME manages session establishment, modification, and release. The MME also manages authentication, authorization, mobility, Non-Access Stratum signaling, ciphering, registration, and security. The HSS authenticates and authorizes users and indicates user services. The HSS also generates user authentication credentials and supports user identification and authorization. The S-GW serves wireless access points, routes data packets, and applies QoS. The P-GW routes data packets, handles network addressing, DHCP, forms anchor points for user mobility, inspects packets, and applies QoS. The PCRF provides policy rules and decisions.

In operation, UEs 301-309 receive an SMS application and a user application from NFVIs 320 over RANs 311-313 under the direction of the slice controller. For example, a VNF in a network slice with UEs 311-313 may download the software to UEs 311-313 upon attachment. UE 301 executes the user application and SMS application and responsively generates a Session Initiation Protocol (SIP) message that indicates SMS and an IMSI for UE 301. The SIP message encapsulates an IP packet. The IP packet encapsulates an SMS message. The IP packet indicates a source IP domain and a destination IP domain for the SMS message. The SMS message comprises an SMS short code and encrypted data.

UE 301 wirelessly transfers the SIP message to RAN 311. RAN 311 transfers the SIP message to computer circuitry in NFVIs 320. A hardware driver in the computer circuitry informs its NFVI operating system of the SIP message, and the NFVI operating system transfers the SIP message over an NFVI virtual switch to a network VNF like a UPF. The network VNF transfers the SIP message over an NFVI virtual switch to the IMS SMS VNFs based on the SMS designation in the SIP packet.

The IMS SMS VNFs receive the SIP message from UE 301. The IMS SMS VNFs authorize UE 301 for SMS. For example, a Call State Control Function (CSCF) may dip a Home Subscriber System (HSS) with the IMSI for UE 301 to yield the SMS authorization. After successful authorization and in response to the SMS short code and the IP domains, the IMS SMS VNFs transfer the IP packet that encapsulates the SMS message to the distributed ledger VNFs.

The distributed ledger VNFs receive the IP packet from the IMS SMS VNFs. The distributed ledger VNFs execute a distributed ledger transaction with the IP domains and SMS short code to determine how the data message should be handled. The message might be routed, stored, discarded and message-handling notifications and/or two-factor authentications may be sent. For example, chain code in distributed ledger 122 may select a route table based on an SMS short code, and then route the SMS message by entering the route table with the IP domains to yield the IMSI for UE 305 and a transfer notice for UE 309. In response, the distributed ledger VNFs commit the IP packet, IMSI for UE 301, IMSI for UE 305, IMSI for UE 309, and transfer notice instruction to distributed ledger memory. The distributed ledger VNFs transfer the IP packet, IMSI for UE 305, IMSI for UE 309, and message transfer notice to the IMS SMS VNFs.

The IMS SMS VNFs receive the IP packet, IMSIs for UEs 305 and 309, and instructions from the distributed ledger VNFs. In response, the IMS SMS VNFs encapsulate the IP packet in a SIP message. The SIP message is addressed from SMS to the IMSI for UE 305. The SMS VNFs also encapsulate a message transfer notice in another SIP message that is addressed from SMS to the IMSI for UE 309. The IMS SMS VNFs transfer the new SIP messages to the network VNFs. The network VNFs transfer the new SIP messages over their virtual switches to the NFVI operating system. The NFVI operating system uses the hardware drivers to transfer the new SIP messages from the computer circuitry.

RAN 312 receives the SIP message for UE 305 and wirelessly delivers the SIP message to UE 305. UE 305 receives the SIP message, decrypts the data in the SMS message, and processes the decrypted data to take an action like exerting machine control. RAN 313 receives the SIP message for UE 309 and wirelessly delivers the SIP message to UE 309. UE 309 receives the SIP message and processes the message transfer notice to take an action like initiating a machine process.

In this example, UE 305 generates an SMS message receipt notice. UE 305 then generates a Session Initiation Protocol (SIP) message that indicates SMS and an IMSI for UE 305. The SIP message encapsulates an IP packet that encapsulates the SMS message receipt notice. The IP packet indicates the source IP domain and the destination IP domain for the SMS message. The SMS message comprises the SMS short code and the message receipt notice. UE 305 wirelessly transfers the SIP message to RAN 312. RAN 312 transfers the SIP message to the computer circuitry in NFVIs 320. A hardware driver in the computer circuitry informs the NFVI operating system of the SIP message, and the NFVI operating system transfers the SIP message over an NFVI virtual switch to a network VNF. The network VNF transfers the SIP message over an NFVI virtual switch to one of the SMS VNFs based on the IMS/SMS designation.

The IMS SMS VNFs receive the SIP message from UE 305. The IMS SMS VNFs authorize UE 305 for SMS. In response to the SMS short code and IP domains, the IMS SMS VNFs transfer the IP packet that encapsulates the SMS message to the distributed ledger VNFs. The distributed ledger VNFs receive the IP packet from the IMS SMS VNFs. The distributed ledger VNFs execute a distributed ledger transaction with the SMS receipt notice, IP domains, and SMS short code to determine how the receipt notice should be handled. In response, the distributed ledger VNFs commit the IP packet, IMSIs for UEs 301, 305, and 309 to distributed ledger memory. The distributed ledger VNFs transfers the IP packet with the SMS message, IMSIs for UEs 301 and 309, and instructions to the IMS SMS VNFs.

The IMS SMS VNFs receive the IP packet, IMSIs, and instructions. In response, the IMS SMS VNFs encapsulate the IP packet in a SIP message that is addressed from SMS to the IMSI for UE 301. The IMS SMS VNFs also encapsulate the IP packet in another SIP message that is addressed from SMS to the IMSI for UE 309. The SMS VNFs transfer the SIP messages to the network VNFs. The network VNFs transfer the SIP messages over a virtual switch to the NFVI operating system. The NFVI operating system uses the hardware drivers to transfer the SIP messages from the computer circuitry. RAN 311 receives the SIP message for UE 301 and wirelessly delivers the SIP message to UE 301. UE 301 receives the SIP message and processes the SMS receipt notice to take an action like stopping a machine process. RAN 313 receives the SIP message for UE 309 and wirelessly delivers the SIP message to UE 309. UE 309 receives the SIP message and processes the SMS receipt notice to take an action like commanding a manufacturing robot.

Figure 4:
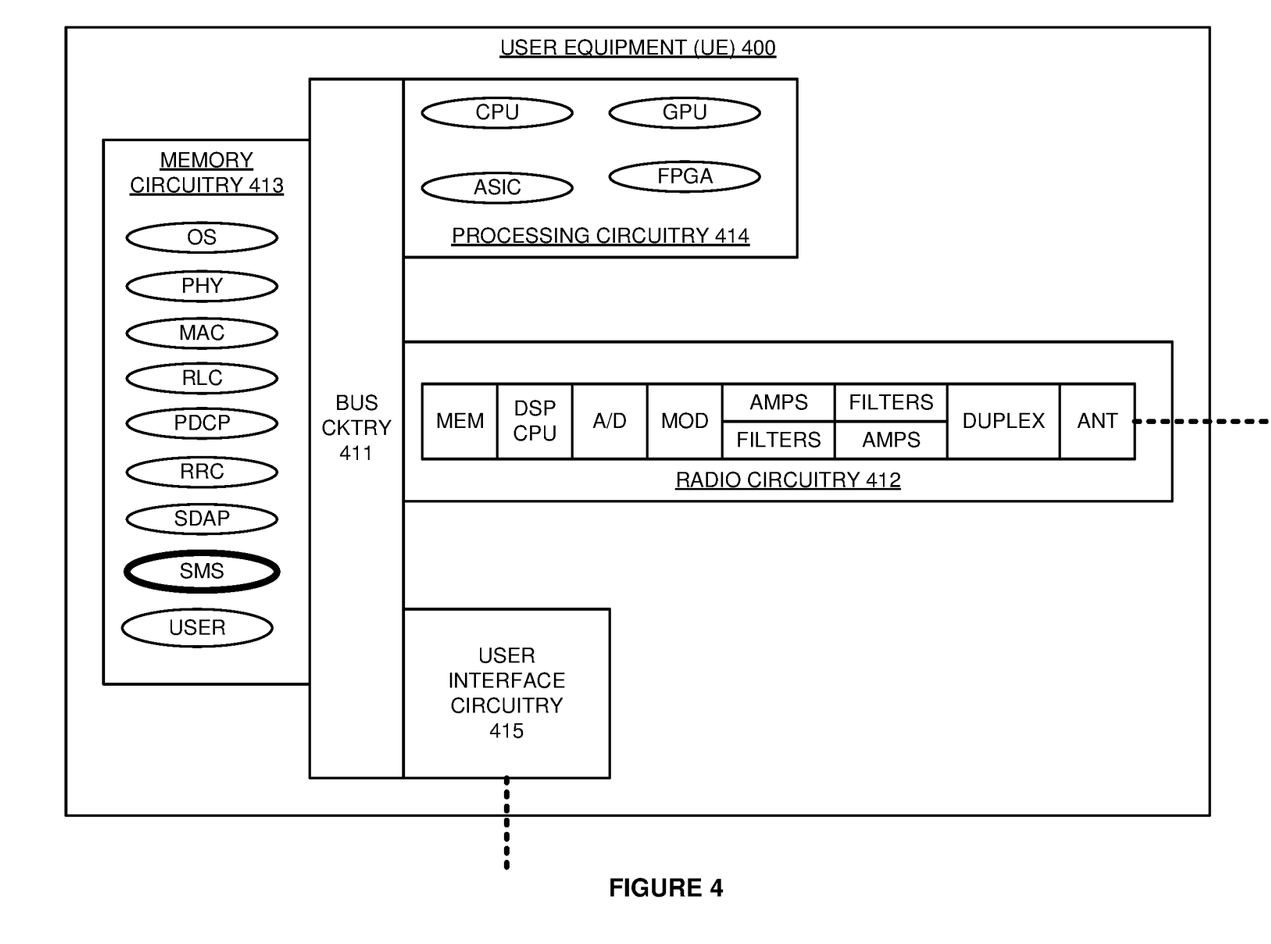
FIG. 4 illustrates wireless User Equipment (UE) to transfer encrypted data over a data messaging service under distributed ledger control.

FIG. 4 illustrates wireless User Equipment (UE) 400 to transfer encrypted data over a data messaging service under distributed ledger control. UE 400 is an example of devices 101-102 and UEs 301-309, although devices 101-102 and UEs 301-309 may differ. UE 400 comprises bus circuitry 411, radio circuitry 412, memory circuitry 413, processing circuitry 414, and user interface circuitry 415. Bus circuitry 411 couples radio circuitry 412, memory circuitry 413, processing circuitry 414, and user interface circuitry 415. Memory circuitry 413 comprises volatile and non-volatile memories like RAM, flash, disc, tape, and the like. Memory circuitry 413 stores an operating system (OS), network applications, user application (User), and Short Message Service application (SMS). The network applications comprise Physical Layer (PHY), Media Access Control (MAC), Radio Link Control (RLC), Packet Data Convergence Protocol (PDCP), Radio Resource Control (RRC), and Service Data Application Protocol (SDAP). Processing circuitry 414 comprises CPUs, GPUs, ASICs, Field Programmable Gate Arrays (FPGAs), and/or some other computer hardware. Processing circuitry 414 executes the operating system and network applications to drive radio circuitry 412 and user interface circuitry 415. User interface circuitry 415 may comprise transceivers, machine controllers, graphic displays, sensors, cameras, and/or some other user components.

Radio circuitry 412 comprises antennas (ANT), duplexers (DUPLEX), filters, amplifiers (AMPS), modulators (MOD), Analog/Digital interfaces (A/D), Digital Signal Processors (DSP), CPUs, and memory (MEM). The antennas in radio circuitry 412 exchange wireless signals including Session Initiation Protocol (SIP) messages with Radio Access Networks (RANs). The DSP/CPUs execute firmware/software to drive the exchange of corresponding data signals between the antennas and the radio memory and to drive the exchange of corresponding data between the radio memory and memory circuitry 413.

Processing circuitry 414 executes the operating system and network applications to drive the exchange of the data between memory circuitry 413 and the SMS application. Processing circuitry 414 executes the operating system and SMS application to drive the exchange of the data between memory circuitry 413 and the user application. Processing circuitry 414 executes the operating system and the user application to process the data and drive user interface circuitry 415. For example, the user application may be a robot controller that processes decrypted SMS commands to issue robot control instructions over a NIC in user interface circuitry 415.

The user application generates data for a destination like a critical machine command for a mobile drone. The user application directs the SMS application to transfer the data to the destination. The SMS application encrypts the data and adds a short code that has local significance—like a critical data indicator. The SMS application forms an SMS message from the short code and the encrypted data. The SMS application translates the destination name into a destination IP address. The SMS application encapsulates the SMS message in an IP packet that is addressed to the destination IP address from a source IP address for UE 400. The SMS application encapsulates the IP packet in a SIP message that is addressed to SMS from the IMSI of UE 400. The SMS application transfers the SIP message to the RRC in the network applications.

The network applications process the SIP message and store Uplink (UL) data that includes the SIP message in the radio memory. In radio circuitry 412, the DSP/CPUs transfer corresponding UL signals to the analog/digital interface. The analog/digital interface converts the digital UL signals into analog UL signals for the modulators. The modulators up-convert the UL signals to their carrier frequencies. The amplifiers boost the UL signals for the filters which attenuate unwanted out-of-band energy. The filters transfer the UL signals through the duplexers to the antennas. The electrical UL signals drive the antennas to emit corresponding wireless UL signals to a RAN.

In radio circuitry 412, the antennas receive wireless Downlink (DL) signals from the RAN and transfer corresponding electrical DL signals through the duplexers to the amplifiers. The amplifiers boost the DL signals for filters which attenuate unwanted energy. In modulation, demodulators down-convert the DL signals from their carrier frequencies. The analog/digital interfaces convert the analog DL signals into digital DL signals for the DSP/CPUs. The DSP/CPUs recover DL data that includes a SIP messages from the DL signals. The DSP/CPUs transfer the DL data to memory circuitry 413. The network applications process the DL data in memory circuitry 413 to forward the SIP messages to the SMS application. The SMS application decrypts the encrypted data. The SMS application transfers the decrypted data—like a critical machine command—to the user application. The user application processes the decrypted user data and responsively drives user interface circuitry 415.

In the network applications, the PHY maps between the MAC transport channels and PHY transport channels. The PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms (FFTs)/Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping.

The MAC maps between the MAC transport channels and MAC logical channels. MAC functions include buffer status, power headroom, channel quality, Hybrid Automatic Repeat Request (HARQ), user identification, random access, user scheduling, and QoS. The RLC maps between the MAC logical channels and Protocol Data Units (PDUs). RLC functions comprise ARQ, sequence numbering and resequencing, segmentation and resegmentation. The RLC exchanges data and signaling with the PDCP. The PDCP maps between the PDUs from the RLC and Service Data Units (SDUs) for the RRC/SDAP. PDCP functions comprise security ciphering, header compression and decompression, sequence numbering and re-sequencing, de-duplication. The PDCP exchange SDUs with the RRC and SDAP.

The RRC handles SIP messages that encapsulate IP packets that encapsulate SMS messages. The RRC handles UE information like IMSI during RRC attachment. The RRC handles UE on-net authentication. The RRC interacts with wireless network controllers like Access and Mobility Functions (AMFs) and/or Mobility Management Entities (MMEs) to establish and terminate data sessions. The RRC supports N1 and Non-Access Stratum (NAS) messaging with the MMEs/AMFs. The RRC handles security and key management, handover operations, status reporting, QoS, system broadcasts, and network pages. The SDAP exchanges S3 data with UPFs under the control of SMFs. The SDAP maps between the SDUs and the QoS flows and mark the QoS flows with the proper QoS.

Figure 5:
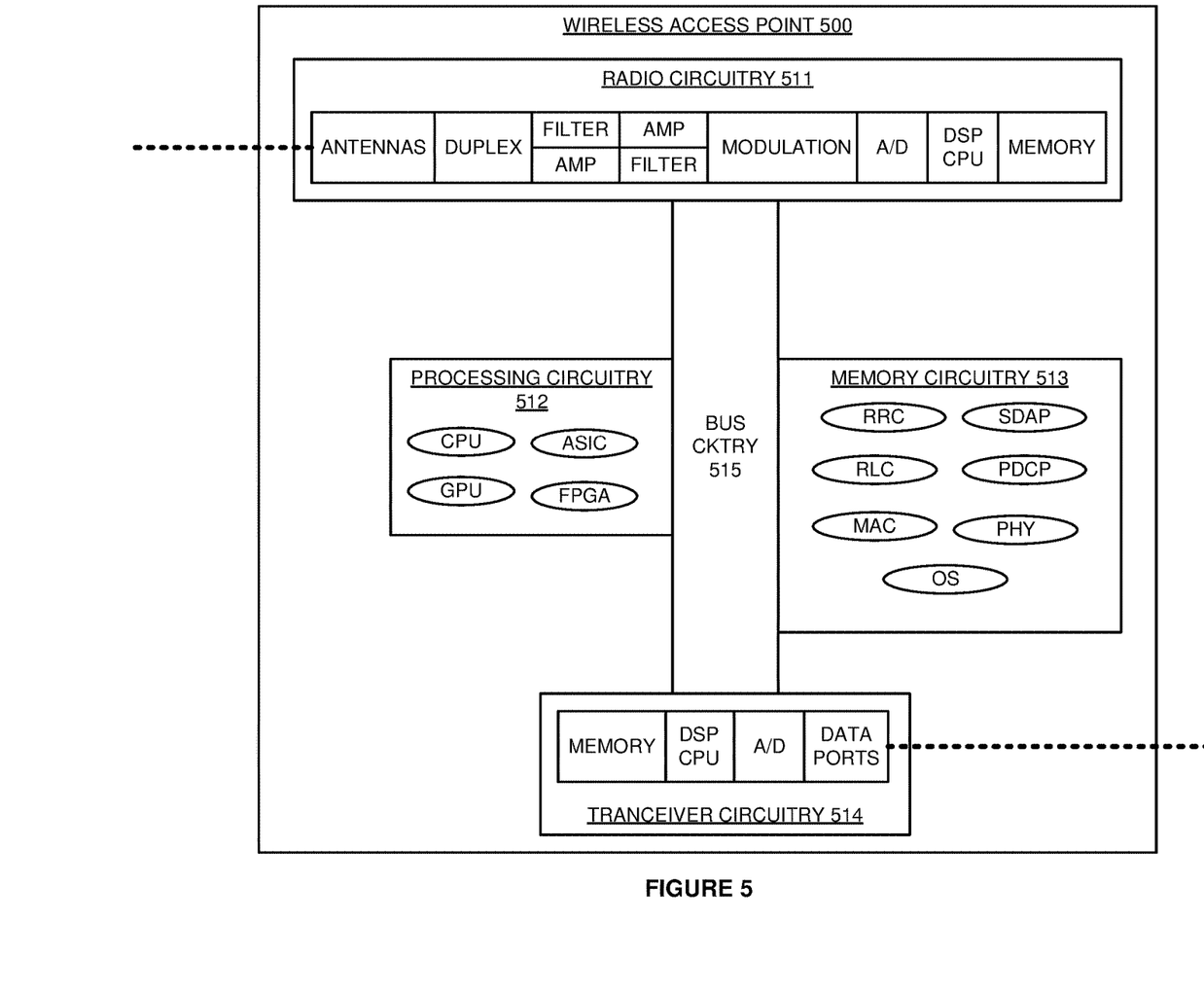
FIG. 5 illustrates a wireless access point to transfer encrypted data over a data messaging service under distributed ledger control.

FIG. 5 illustrates wireless access point 500 to transfer encrypted data over a data messaging service under distributed ledger control. Wireless access point 500 is an example of data links 103-104 and RANs 311-313, although links 103-104 and RANs 311-313 may differ. Wireless access point 500 comprises radio circuitry 511, processing circuitry 512, memory circuitry 513, transceiver circuitry 514, and bus circuitry 515. Bus circuitry 515 couples radio circuitry 511, memory circuitry 512, processing circuitry 513, and transceiver circuitry 514. Processing circuitry 512 comprises CPUs, GPUs, ASICs, FPGAs, and/or some other computer circuitry. Memory circuitry 513 comprises volatile and non-volatile memories like RAM, flash, disc, tape, and the like. Memory circuitry 513 stores an operating system and network applications. The network applications comprise PHY, MAC, RLC, PDCP, RRC, SDAP, and the like. Processing circuitry 512 executes the operating system and applications to drive radio circuitry 511 and transceiver circuitry 514.

Radio circuitry 511 comprises antennas, duplexers, filters, amplifiers, modulators, A/D interfaces, DSP/CPU, and memory. The antennas in radio circuitry 511 exchange wireless data and signaling with UEs. The DSP/CPUs execute firmware/software to drive the exchange of the data and signaling between the antennas and memory circuitry 513. Processing circuitry 512 executes the operating systems and network applications to drive the exchange of data and signaling between radio circuitry 511 and transceiver circuitry 514 through memory circuitry 513.

In radio circuitry 511, the antennas receive wireless UL signals including SIP messages from wireless UEs and transfer corresponding electrical UL signals through the duplexers to the amplifiers. The amplifiers boost the UL signals for filters which attenuate unwanted energy. In modulation, demodulators down-convert the UL signals from their carrier frequencies. The A/D interfaces convert the analog UL signals into digital UL signals for the DSP/CPUs. The DSP/CPUs recover UL data and signaling from the UL signals—including the SIP messages. The DSP/CPUs transfer the UL data and signaling to memory circuitry 513. The network applications process the UL data and signaling in memory circuitry 513 generate additional UL signaling. The network applications forward the UL data and signaling to a network core over transceiver circuitry 514.

Transceiver circuitry 514 receives DL data and signaling that include SIP messages from the network core and stores the DL data and signaling in memory circuitry 513. The network applications process the DL data and signaling in memory circuitry 513 generate additional DL signaling. The network applications forward the DL data and signaling to radio circuitry 511. In radio circuitry 511, the DSP/CPUs transfer corresponding DL signals to the A/D interface. The A/D interface converts the digital DL signals into analog DL signals for the modulators. The modulators up-convert the DL signals to their carrier frequencies. The amplifiers boost the DL signals for the filters which attenuate unwanted out-of-band energy. The filters transfer the DL signals through the duplexers to the antennas. The electrical DL signals drive the antennas to emit corresponding wireless DL signals that include the SIP messages to the UEs.

In the networking circuitry, the PHY maps between the MAC transport channels and PHY transport channels. The PHY functions comprise packet formation/deformation, windowing/de-windowing, guard-insertion/guard-deletion, parsing/de-parsing, control insertion/removal, interleaving/de-interleaving, FEC encoding/decoding, rate matching/de-matching, scrambling/descrambling, modulation mapping/de-mapping, channel estimation/equalization, FFTs/IFFTs, channel coding/decoding, layer mapping/de-mapping, precoding, DFTs/IDFTs, and RE mapping/de-mapping. The MAC maps between the MAC transport channels and MAC logical channels. MAC functions include buffer status, power headroom, channel quality, HARQ, user identification, random access, user scheduling, and QoS. The RLC maps between the MAC logical channels and PDUs. RLC functions comprise ARQ, sequence numbering and resequencing, segmentation and resegmentation. The RLC exchanges data and signaling with the PDCP. The PDCP maps between the PDUs from the RLC and SDUs for the RRC/SDAP. PDCP functions comprise security ciphering, header compression and decompression, sequence numbering and re-sequencing, de-duplication. The PDCP exchange SDUs with the RRC and SDAP. The RRC interacts with wireless network controllers like AMFs and/or MMEs to establish and terminate data sessions. The RRC supports N1 and NAS messaging with the MMEs/AMFs. The RRC handles security and key management, handover operations, status reporting, QoS, system broadcasts, and network pages. The SDAP exchanges S3 data with UPFs under the control of SMFs. The SDAP maps between the SDUs and the QoS flows and mark the QoS flows with the proper QoS.

Figure 6:
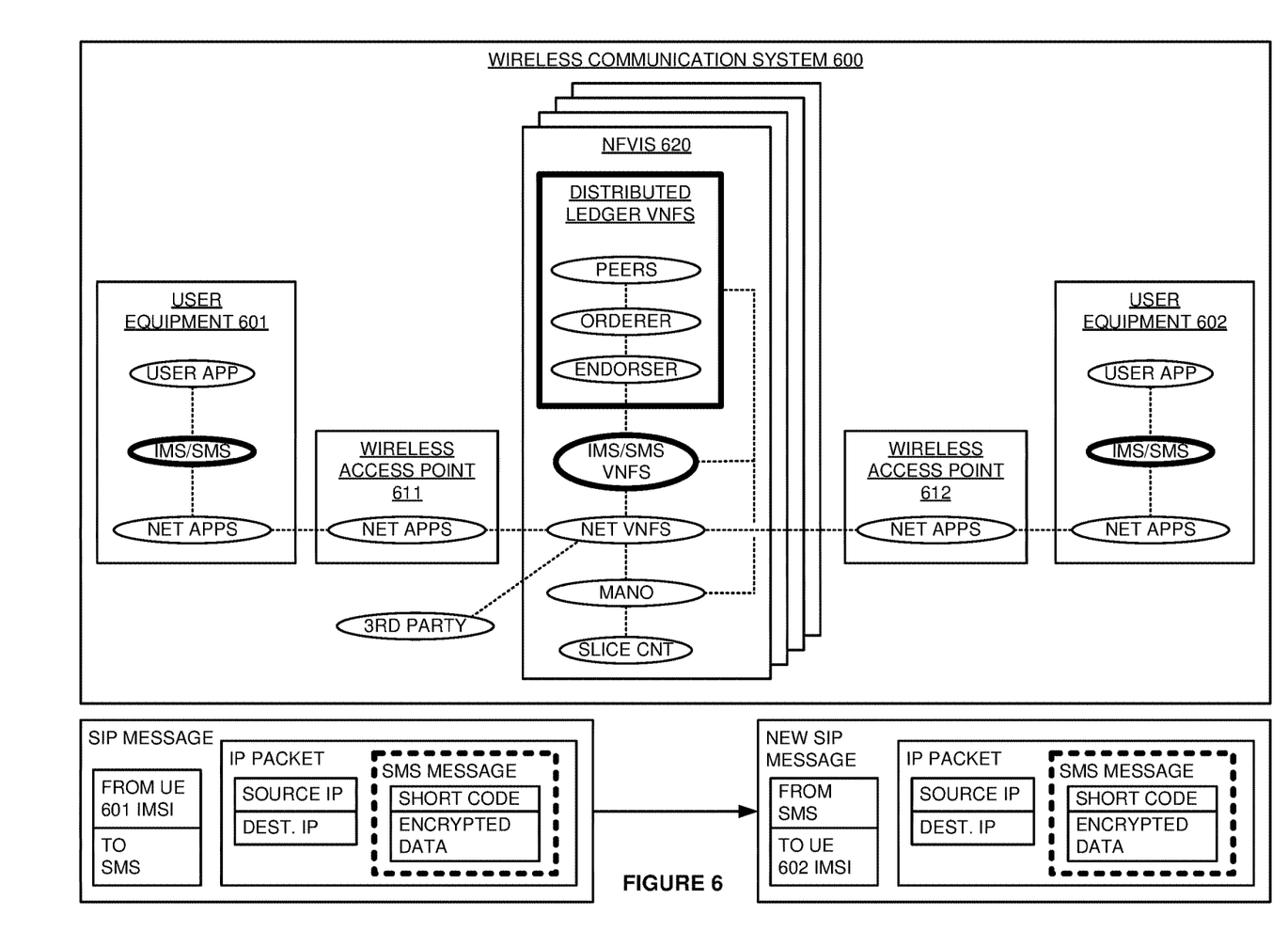
FIG. 6 illustrates a wireless communication system to transfer the encrypted data for a data messaging service under distributed ledger control.

FIG. 6 illustrates wireless communication system 600 to transfer encrypted data for a data messaging service under distributed ledger control. Wireless communication system 600 is an example of communication systems 100 and 300, although systems 100 and 300 may differ. Wireless communication system 600 comprises User Equipment (UEs) 601-602, wireless access points 611-612, and NFVIs 620.

In NFVIs 620, a slice controller (CNT) receives operator instructions and responsively launches a network slice that includes network VNFs, IMS/SMS VNFs, distributed ledger VNFs, and UEs 601-602. The slice controller directs the MANO to instantiate forwarding graphs and service descriptors for the network slice. The forwarding graphs and service descriptors specify the VNFs, virtual switch connections, and physical network interconnections. The MANO directs NFVIs 620 to execute the VNFs per the forwarding graphs and service descriptors.

NFVIs 620 execute the network VNFs, IMS/SMS VNFs, distributed ledger VNFs, virtual switches, and other virtual machine components. In response to the forwarding graphs and service descriptors, the network VNFs establish connectivity to the network apps in wireless access points 611-612 over physical network interfaces. The network VNFS establish connectivity to the IMS/SMS VNFs over virtual switches based on forwarding graphs and service descriptors. The IMS/SMS VNFS establish connectivity to the distribute ledger VNFs over virtual switches based on forwarding graphs and service descriptors. The IMS/SMS VNFS transfer IMS/SMS applications to UEs 601-602.

The network applications in UE 601 attach to the network applications in wireless access point 611 and then to the network applications in NFVIs 620. The network applications in UE 602 attach to the network applications in wireless access point 612 and then to the network applications in NFVIs 620. For example, an AMF may dip an AUSF to authorize IMS service for UEs 601-602, and an SMF may dip a PCF to determine policies for UEs 601-602.

In UE 601, the user application generates user data for the user application in UE 602. The user application transfers the user data, priority, and UE name to the IMS/SMS application. The IMS/SMS application translates the priority into an SMS short code. The IMS/SMS application encrypts the user data. The IMS/SMS application forms an SMS message from the short code and the encrypted data. The IMS/SMS application translates the UE 602 name into a destination IP address. The IMS/SMS application encapsulates the SMS message in an IP packet. The IP packet is addressed to the destination IP address from a source IP address for UE 601. The IMS/SMS application encapsulates the IP packet in a SIP message. The SIP message is addressed to SMS from the IMSI for UE 601.

The IMS/SMS application transfers the SIP message to the RRC in the network applications. The RRC in the network applications in UE 601 transfers the SIP message to the RRC in the network applications in wireless access point 611. The RRC in the network applications in wireless access point 611 transfers the SIP message to the network VNFs in NFVIs 620. The network VNFs transfer the SIP message to the IMS/SMS VNFs.

The IMS/SMS VNFs receive the SIP message from UE 601. The IMS/SMS VNFs authorize UE 601 for SMS. For example, a CSCF may dip an HSS with the IMSI for UE 601 to yield the SMS authorization. After successful authorization and in response to the SMS short code and the IP domains, the SMS VNFs transfer the IP packet that encapsulates the SMS message to an endorser node in the distributed ledger VNFs.

The endorser node in the distributed ledger VNFs receives the IP packet from the IMS/SMS VNFs. The endorser node executes chain code to perform a test transaction with the IP domains and SMS short code to generate a test result. If the test result complies with pre-stored endorsement rules, then the endorser node (or an IMS/SMS VNF) transfers the endorsed transaction to a ledger orderer node that distributes the endorsed transaction to ledger peer nodes per a peer distribution list. In response to the transaction endorsement, the ledger peer nodes execute the chain code to process the IP domains and SMS short code to generate a message-handling instruction. The ledger peer nodes reach a consensus on the message-handling instruction before committing the IP packet and message-handling instruction to distributed ledger databases in an immutable blockchain format. The endorser node in the distributed ledger VNFs transfers message-handling instruction and IP packet to the IMS/SMS VNFs.

The IMS/SMS VNFs receive the IP packet and the message-handling instruction from the distributed ledger VNFs. In response to the message-handling instruction, the IMS/SMS VNFs encapsulate the IP packet in a SIP message. The SIP message is addressed from the SMS to the IMSI of UE 602. The SMS VNFs transfer the SIP message to the network VNFs. The network VNFs transfer the SIP message to the network applications in wireless access point 612. The network applications in wireless access point 612 transfer the SIP message to the network applications in UE 602.

The network applications in UE 602 transfer the SIP message to the IMS/SMS application. The IMS/SMS application decrypts the user data in the SMS message. The IMS/SMS application translates the source IP domain into a name for UE 601. The IMS/SMS application translates the short code into the priority. The IMS/SMS application decrypts the user data. The IMS/SMS application transfers the decrypted user data, the priority, and the name for UE 601 to the user application. The user application in UE 602 processes the user data based on its source and priority.

In UE 602, the IMS/SMS application generates an SMS receipt notice for the received SMS message and transfers the SMS receipt notice in an IP packet that is encapsulated in a SIP message. The SMS receipt notice has the SMS short code and receipt metadata for the received SMS message. The IP packet is from the previous destination IP domain to the previous source IP domain. The SIP message is from the IMSI of UE 602 to the SMS. The SMS application transfers the SIP message to the RRC in the network applications.

The RRC in the network applications in UE 602 transfers the SIP message to the RRC in the network applications in wireless access point 612. The RRC in the network applications in wireless access point 612 transfers the SIP message to the network VNFs in NFVIs 620. The network VNFs transfer the SIP message to the IMS/SMS VNFs. The IMS/SMS VNFs receive the SIP message from UE 602. The IMS/SMS VNFs authorize UE 602 for SMS. In response to the SMS short code and IP domains, the IMS/SMS VNFs transfer the IP packet that encapsulates the SMS message to an endorser node in the distributed ledger VNFs.

The endorser node in the distributed ledger VNFs receives the IP packet from the IMS/SMS VNFs. The endorser node executes chain code to perform a test transaction with the IP domains, SMS short code, and receipt notice to generate a test result. If the test result complies with pre-stored endorsement rules, then the endorser node (or an IMS/SMS VNF) transfers the endorsed transaction to a ledger orderer node that distributes the endorsed transaction to ledger peer nodes per a peer distribution list. In response to the transaction endorsement, the ledger peer nodes execute the chain code to process the IP domains, SMS short code, and receipt notice to generate a message-handling instruction. The ledger peer nodes reach a consensus on the message-handling instruction before committing the IP packet and message-handling instruction to distributed ledger databases in an immutable blockchain format. The endorser node in the distributed ledger VNFs transfers the message-handling instruction and IP packet to the IMS/SMS VNFs.

The IMS/SMS VNFs receive the IP packet and the message-handling instruction from the distributed ledger VNFs. In response to the message-handling instruction, the IMS/SMS VNFs encapsulate the IP packet in two SIP messages. The first SIP message is addressed from the SMS to the IMSI of UE 601. The second message is addressed from the SMS to a third party. The SMS VNFs transfer the SIP messages to the network VNFs. The network VNFs transfer one of the SIP messages to the third-party. The network VNFs transfer the other SIP message to the network applications in wireless access point 611. The network applications in wireless access point 611 transfer the SIP message to the network applications in UE 601.

In UE 601, the network applications transfer the SIP message to the IMS/SMS application. The IMS/SMS application translates the source IP domain into a name for UE 602. The IMS/SMS application translates the SMS short code into the priority. The IMS/SMS application transfers the receipt notice, the priority, and the name for UE 602 to the user application. The user application in UE 601 processes the receipt notice.

Consider an example where UE 601 requires sensitive access to UE 602. UE 601 transfers an SMS message with the access request and a passcode as described above. UE 602 receives the SMS message and validates the passcode. For two-factor verification, UE 602 sends a verification code in an SMS message to the IMSI for UE 601. Based on the IP domains, SMS short-code, and two-factor verification code, the IMS/SMS VNFs transfer the IP packet having the SMS message to an endorser node in the distributed ledger VNFs. The endorser node executes chain code to perform a test transaction with the IP domains, SMS short code, and two-factor verification code to generate a test result. If the test result complies with pre-stored endorsement rules, then the endorser node (or IMS/SMS VNF) transfers the endorsed transaction to a ledger orderer node that distributes the endorsed transaction to ledger peer nodes per a peer distribution list.

In response to the transaction endorsement, the ledger peer nodes execute the chain code to process the IP domains, SMS short code, and two-factor verification code to generate a message-handling instruction. The ledger peer nodes reach a consensus on the message-handling instruction before committing the IP packet and message-handling instruction to distributed ledger databases in an immutable blockchain format. The endorser node in the distributed ledger VNFs transfers message-handling instruction and IP packet to the IMS/SMS VNFs.

The IMS/SMS VNFs receive the IP packet and the message-handling instruction from the distributed ledger VNFs. In response to the message-handling instruction, the IMS/SMS VNFs encapsulate the IP packet in a SIP message. The SIP message is addressed from the SMS to the IMSI of UE 602. The IMS/SMS VNFs transfer the SIP message to the network VNFs. The network VNFs transfer the SIP message to the network application in wireless access point 612. The network applications in wireless access point 612 transfer the SIP message to the network applications in UE 602. The network applications in UE 602 transfer the SIP message to the IMS/SMS application. The IMS/SMS application translates the source IP domain into a name for UE

601. The IMS/SMS application translates the SMS short code into the priority. The IMS/SMS application transfers the verification code and the name for UE 601 to the user application. The user application in UE 602 processes the verification code to successfully complete the two-factor authentication. In response to the two-factor verification, the user application in UE 602 provides sensitive access to UE 601. For example, UE 602 may comprise a manufacturing robot, and UE 601 may comprise a robot controller.

The wireless data network circuitry described above comprises computer hardware and software that form special-purpose network circuitry that transfers encrypted data for a data messaging service under distributed ledger control. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry that transfers encrypted data for a data messaging service under distributed ledger control.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a messaging server to deliver a user message for a wireless User Equipment (UE) that generates the user message, generates a network packet for delivery to the messaging server that encapsulates the user message, and transfers the network packet that encapsulates the user message to the messaging server over a wireless communication network, the method comprising:
   in the messaging server, processing circuitry receiving the network packet that encapsulates the user message from the wireless communication network, and in response to the network packet, transferring the user message to ledger circuitry;
   in the messaging server, the ledger circuitry receiving the user message from the processing circuitry, executing a distributed ledger transaction based on a source domain and a destination domain in the user message, and transferring the user message to the processing circuitry after the distributed ledger transaction; and
   in the messaging server, the processing circuitry receiving the user message from the ledger circuitry, generating a new network packet for delivery to the destination domain that encapsulates the user message, and transferring the new network packet that encapsulates the user message for delivery to the destination domain.

2. The method of claim 1 wherein the source domain comprises a number, name, or address for the wireless UE.

3. The method of claim 1 wherein the destination domain comprises a number, name, or address for another wireless UE.

4. The method of claim 1 wherein the destination domain comprises a messaging short code.

5. The method of claim 1 wherein the user message comprises a Short Message Service (SMS) message.

6. The method of claim 1 wherein at least one of the network packet and the new network packet comprise Session Initiation Protocol (SIP) messages.

7. The method of claim 1 wherein at least one of the processing circuitry and the ledger circuitry comprise Network Function Virtualization Infrastructure (NFVI) circuitry executing at least one Virtual Network Function (VNF).

8. The method of claim 1 wherein:
   the ledger circuitry executing the distributed ledger transaction comprises generating a user notice and transferring the user notice to the processing circuitry; and further comprising
   the processing circuitry receiving the user notice, encapsulating the user notice in another network packet for delivery to the wireless UE, and transferring the other network packet over the wireless communication network to the wireless UE.

9. The method of claim 1 wherein:
   the ledger circuitry executing the distributed ledger transaction comprises generating a third-party notice and transferring the third-party notice to the processing circuitry; and further comprising
   the processing circuitry receiving the third-party notice, encapsulating the third-party notice in another network packet for delivery to the third-party, and transferring the other network packet for delivery to the third-party.

10. The method of claim 1 wherein the ledger circuitry executing the distributed ledger transaction comprises storing the user message in a blockchain format.

11. A messaging server to deliver a user message for a wireless User Equipment (UE) that generates the user message, generates a network packet for delivery to the messaging server that encapsulates the user message, and transfers the network packet that encapsulates the user message to the messaging server over a wireless communication network, the messaging server comprising:
   processing circuitry configured to receive the network packet that encapsulates the user message from the wireless communication network, and in response to the network packet, transfer the user message to ledger circuitry;

ledger circuitry configured to receive the user message from the processing circuitry, execute a distributed ledger transaction based on a source domain and a destination domain in the user message, and transfer the user message to the processing circuitry after the distributed ledger transaction; and the processing circuitry configured to receive the user message from the ledger circuitry, generate a new network packet for delivery to the destination domain that encapsulates the user message, and transfer the new network packet that encapsulates the user message for delivery to the destination domain.

12. The messaging server of claim 11 wherein the source domain comprises a number, name, or address for the wireless UE.

13. The messaging server of claim 11 wherein the destination domain comprises a number, name, or address for another wireless UE.

14. The messaging server of claim 11 wherein the destination domain comprises a messaging short code.

15. The messaging server of claim 11 wherein the user message comprises a Short Message Service (SMS) message.

16. The messaging server of claim 11 wherein at least one of the network packet and the new network packet comprise Session Initiation Protocol (SIP) messages.

17. The messaging server of claim 11 wherein at least one of the processing circuitry and the ledger circuitry comprise Network Function Virtualization Infrastructure (NFVI) circuitry executing at least one Virtual Network Function (VNF).

18. The messaging server of claim 11 wherein:

the ledger circuitry is configured to generate a user notice and transfer the user notice to the processing circuitry responsive to executing the distributed ledger transaction; and further comprising the processing circuitry configured to receive the user notice, encapsulate the user notice in another network packet for delivery to the wireless UE, and transfer the other network packet over the wireless communication network to the wireless UE.

19. The messaging server of claim 11 wherein:

the ledger circuitry is configured to generate a third-party notice and transfer the third-party notice to the processing circuitry responsive to executing the distributed ledger transaction;

and further comprising the processing circuitry configured to receive the third-party notice, encapsulate the third-party notice in another network packet for delivery to the third-party, and transfer the other network packet for delivery to the third-party.

20. The messaging server of claim 11 wherein the ledger circuitry is configured to store the user message in a blockchain format when executing the distributed ledger transaction.

* * * * *